Aug. 10, 1965  W. J. ANDERSON ETAL  3,200,186
ORGAN STOP MECHANISM
Filed Oct. 10, 1960  3 Sheets-Sheet 1
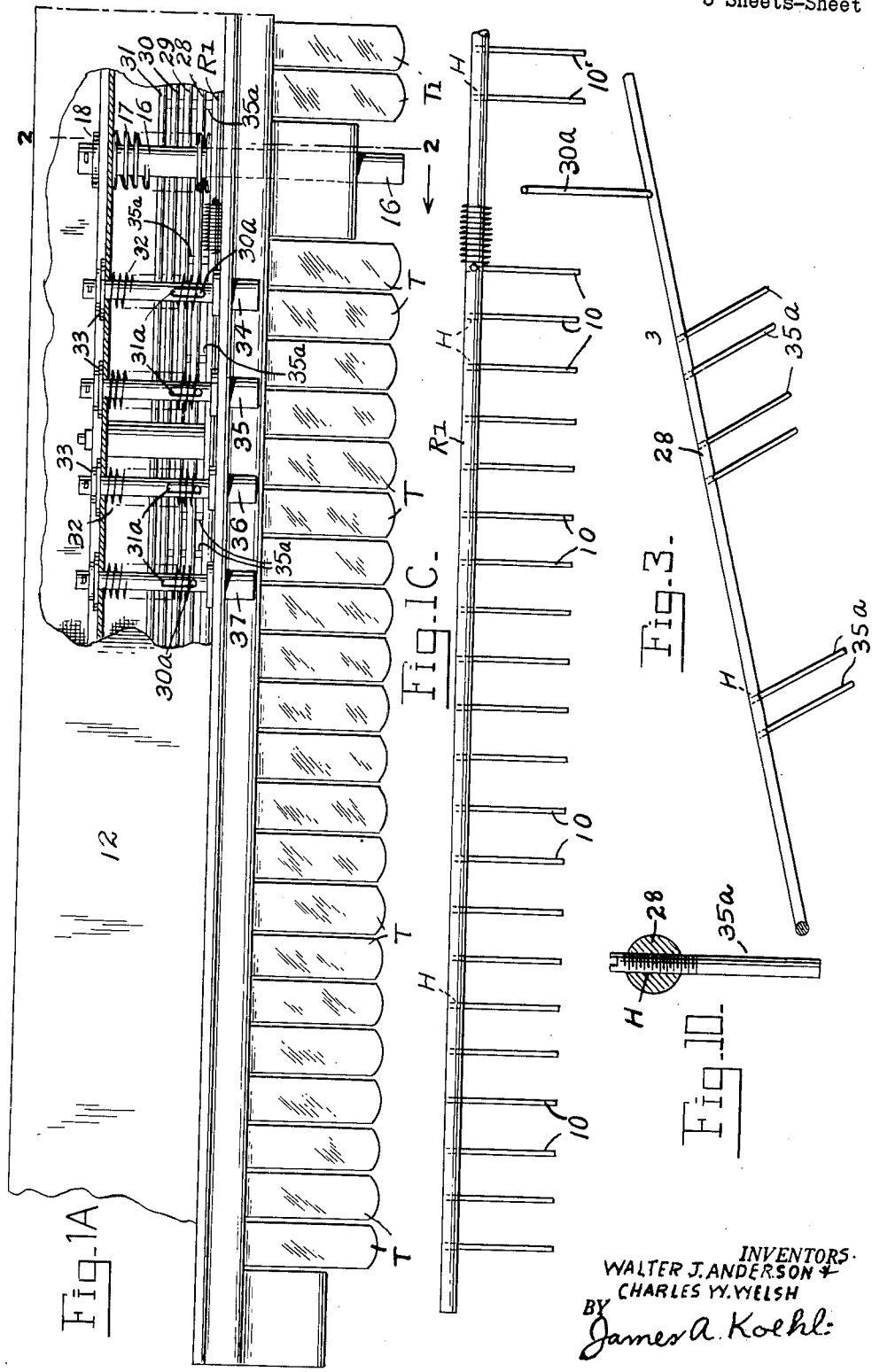
INVENTORS.
WALTER J. ANDERSON &
CHARLES W. WELSH
BY
James A. Koehl:

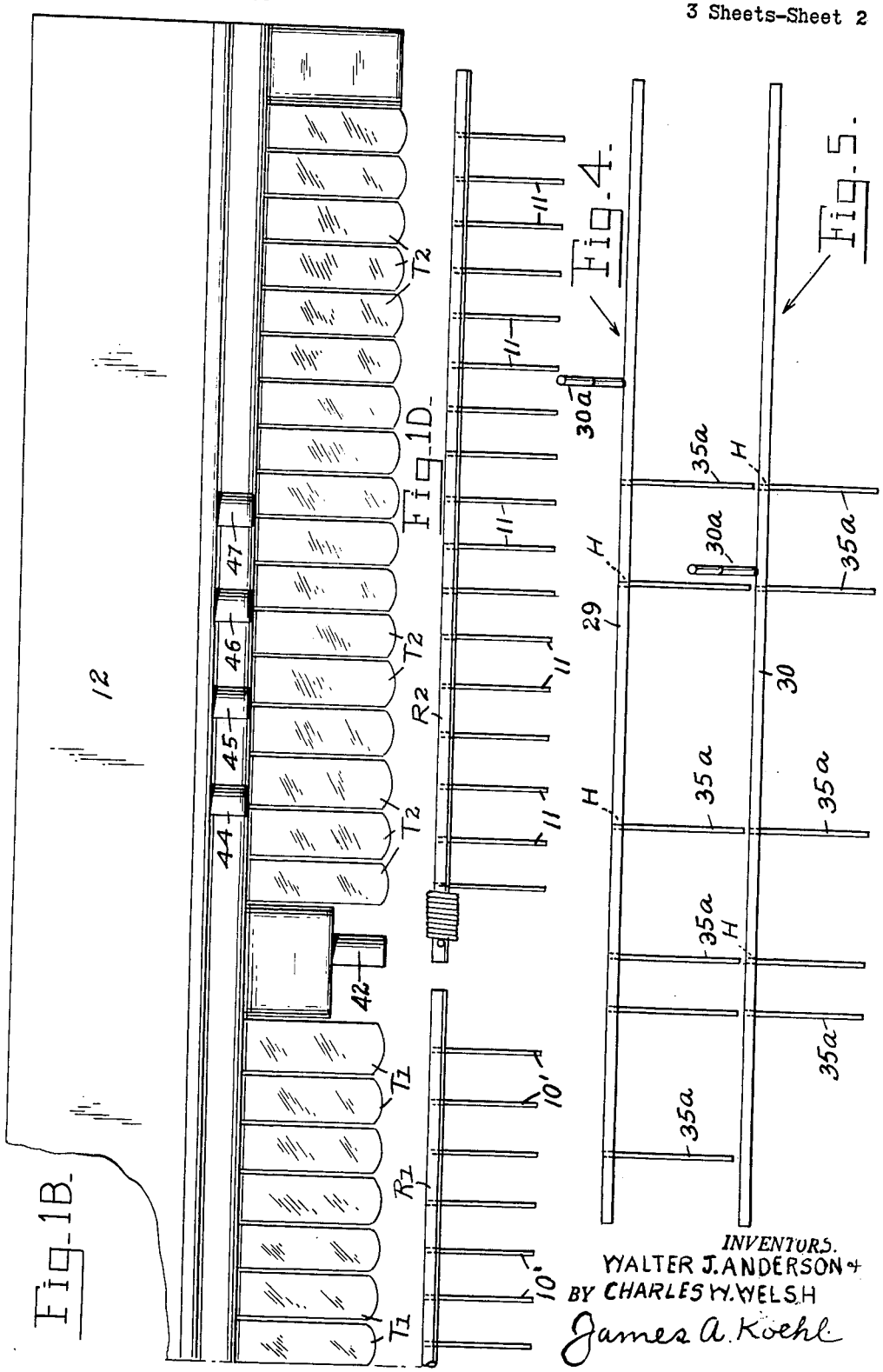

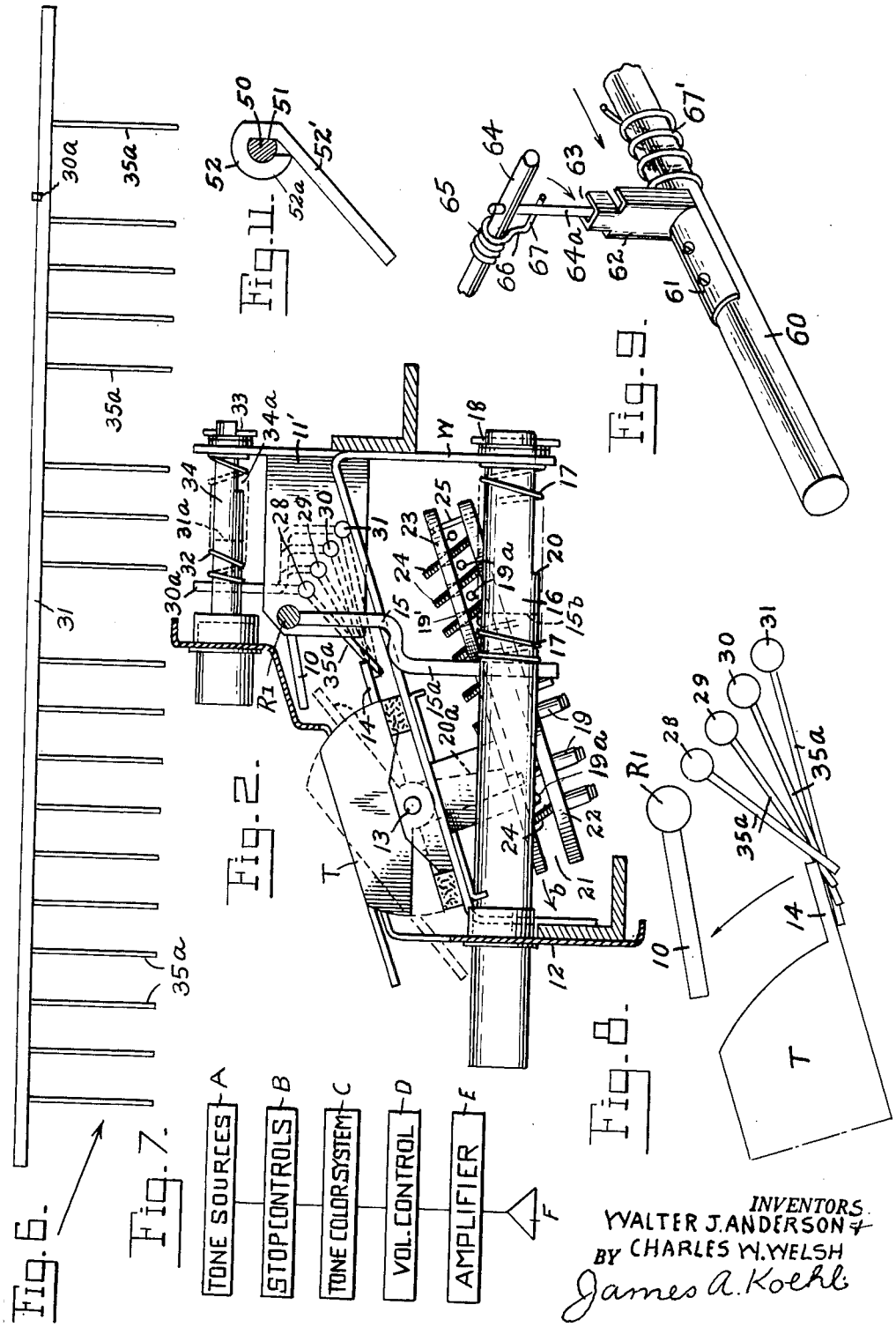

United States Patent Office 3,200,186
Patented Aug. 10, 1965

3,200,186
ORGAN STOP MECHANISM
Walter J. Anderson, 810 Forest Ave., Elgin, Ill., and Charles W. Welsh, 30 Sparrow Road, Carpentersville, Ill.
Filed Oct. 10, 1960, Ser. No. 61,712
4 Claims. (Cl. 84—1.19)

This invention relates to a new and improved stop mechanism for electrical organs employing tone color systems for electronic synthesis of electric waves of musical frequencies providing waveforms characteristic of given stops of the pipe organ and sounds simulating different orchestral and percussion instruments.

The primary object of the invention is an assembly of stop switches and associated controls for facilitating drawing and retiring stops with speed and convenience in playing and to greatly extend the musical possibilities of electrical organs.

A further object is the provision of a stop mechanism enabling individually drawing and retiring any stop of an assembly thereof and whereby preset combinations of stops can be drawn and retired as desired and other stops added thereto for discriminate shading of resultant sounds.

A still further object is the embodiment of unique means whereby the player can change preset combinations of stops according to his individual taste and the type of music playable for different occasions.

Another object is the provision of means for instantaneously clearing either manual of the organ of all drawn stops.

The novel features of our invention are set forth with particularity in the hereto appended claims. The invention, however, both as to its organization and its method of operation and advantages thereof, will be fully understood from the following description of a specific embodiment thereof taken in connection with the accompanying drawings, in which:

FIGURES 1A and 1B together constitute a view in top plan of the invention with a part of the casing broken away and a part in section;

FIGURES 1C and 1D taken together constitute a top plan view of the stop retiring means;

FIGURE 2 is a transverse section about on the line 2—2 of FIGURE 1A showing the parts on an enlarged scale;

FIGURE 3 is a plan view of rocker rod 28;
FIGURE 4 is a plan view of rocker rod 29;
FIGURE 5 is a plan view of rocker rod 30;
FIGURE 6 is a plan view of rocker rod 31;
FIGURE 7 is a block diagram of the interrelated and interconnected mechanisms of the organ;
FIGURE 8 is a schematic view of the respective stop drawing and stop clearing rocker rods;
FIGURE 9 is a perspective on an enlarged scale of a modified form of piston for operating the stop clearing means for the tabs of the "Swell" manual;
FIGURE 10 is a transverse section on an enlarged scale of one of the stop drawing rods showing the manner of connecting one of the tab actuators thereto;
FIGURE 11 is a view similar to FIGURE 10 showing a slightly modified form of tab actuator.

The system employed herein for determining tone colors designating the stops of the organ may function either according to the theory of harmonic synthesis or according to the formant theory or both of these theories. For example, a formant defining a frequency range for a resultant waveform typical of a tone designated by one of the stops can, by commonly employed techniques provide the basis for another stop by mixing with it one or more sine waves of given frequency and intensity. Similarly, complex waveforms produced according to these theories can be mixed together to provide waveforms typical of different stops. No claim is made herein for the tone color system apart from use thereof in the disclosed environment. Prior patents disclosing satisfactory ways and means for producing waveforms suitable for the purpose of the invention are: Keith No. 1,885,728; Miller No. 1,791,319; Langer No. 2,403,664; Larsen No. 2,403,090; Blumlein No. 2,468,840; Cahill Nos. 580,035, 1,213,803 and 1,213,804; Hammond No. 1,956,350 and Anderson Nos. 2,823,310, 2,818,762, 2,819,640, 2,811,887 and Re. 24,743. Neither do we make claim for the stop switch employed herein apart from use thereof in the disclosed environment, there being, however, a preference for a multiple contact switch which enables convenient use of contacts in a number corresponding to the number of sources from which waveforms are derived from the tone color system. The switch disclosed in the Mann et al. Patent No. 2,816,181 has proved entirely satisfactory.

Referring to FIGURES 1A and 1B, we point to the fact that except for the position occupied by the stop retiring or clearing piston 16 for the stop switch control tabs T and T1 for the "Swell" manual and the position occupied by the stop retiring or clearing piston 42 for the tabs T2 for the "Great" manual, the three assemblies of these tabs form an unbroken longitudinal row of tabs, which, with the preset pistons 34–37 and 44–47 for drawing different combinations of stops, will be mounted upon the console of the organ immediately above the "Swell" manual where all of these elements can be conveniently managed by the player.

The stop switch assemblies comprising tabs T and T1 for the "Swell" manual and tabs T2 for the "Great" manual are quite similar. The assemblies comprising tabs T and T2 are sensibly identical, each coacting with a stop switch to be hereinafter described. That which can be accomplished by one thereof can be accomplished by the other, such as, for example, (1) the feature enabling drawing and retiring stops individually; (2) concurrently drawing and retiring preset combinations of stops; (3) adding to a drawn preset combination of stops any stop or such of them as desired for tonal shading; (4) concurrently retiring all drawn stops, and (5) changing the preset combinations to suit the individual taste of the player and the occasion for music of a particular type.

The specific difference between the "Swell" and "Great" manual stop switch assemblies exists in combining tabs T1 with tabs T for special sound effects when playing either the "Swell" or the "Great" manual or both thereof. These tabs and tabs T are coactive with the same mechanism. Any one of the tabs T1 can be operated individually. When stops have been drawn by operation of tabs T1 and T, all thereof can be concurrently retired upon operating piston 16. The above elements and the mode of operation thereof comprise the characterizing features of our invention. FIGURE 2 will be considered as typical of the arrangement and relationship of the disclosed elements as regards each of the tabs T and T2, it being understood that in the assembly of tabs T1, no provision has been made enabling drawing preset combinations of stops.

At FIGURE 7, the interrelated and interconnected mechanisms comprise tone frequency sources A, preferably adapted to produce complex waveforms of different musical frequencies; a system of stop controls B, a tone color system C, volume control D, amplifier E and loud speaker F, amplifier E and loud speaker F providing an electroacoustic translating system for converting the outputs of sources A into audible sounds according as tabs T, T1 and T2 are operated.

At FIGURES 1A and 1B are rocker rods R1 and R2. Rod R1 has radiating therefrom rigid enlongated tab actuators 10 and 10′, the former common to tabs T and the latter common to tabs T1 as will be fully described when referring to FIGURE 2. Rocker rod R2 has radiating therefrom rigid actuators 11. The number of actuators 10 on rocker rod R1 corresponds with the number of tabs T. The number of actuators 10′ on said rocker rod R1 is the same as the number of tabs T1, and the actuators 11 on rocker rod R2 are the same in number as tabs T2. These rocker rods are shown in displaced relation to tabs T, T1 and T2 to make clear that for each tab of the three assemblies thereof there is an actuator; that tabs T and T1 are common to rocker rod R1 and are adapted to be operated concurrently to clear the organ of all drawn stops of the "Swell" manual. Similarly, all tabs associated with the respective actuators on rocker rod R2 can be operated concurrently to clear the organ of all stops of the "Great" manual. It is also noted that all actuators 10, 10′ and 11 are in longitudinal alignment and that those of each set are equidistantly spaced apart from each other.

At FIGURE 2, rocker rod R1 common to tabs T and T1 is mounted in frame 11′ contained in a casing 12 so that it can turn respectively in limited clockwise and counter clockwise directions. FIGURE 2 is a section taken on line 2—2 of FIGURE 1A looking in the direction of tabs T. One such tab is shown mounted in casing 12 to tilt vertically about a horizontal axis 13. At the lower side and at the rear end of the tab is a flat rigid fin 14 of rigid material, preferably an integral part of the tab which may be of a plastic composition. When the tab is in the full line position, actuator 10 on rocker rod R1 is at the upper limit of its tilting motion and disposed in the direct path of fin 14, actuator 10 being of a length to overhang the fin and press downward thereon when the tab is in the dotted line position and rocker rod R1 is turned in a counter clockise direction. Rocker rod R1 has a depending crank arm 15, the lower extremity 15a of which is received in a slot 15b in a slidably supported piston 16 disposed transversely of the casing 12 and below the plane of tab T. Coil spring 17 encircles the rear end of the piston and has its front end bearing against the extremity 15a of crank arm 15 and its rear end pressing against the inner face of part W of the casing 12 thus to urge the piston in a forward direction and turn rocker rod R1 in a clockwise direction and dispose actuator 10 at the upper limit of its motion. Motion of the piston in a forward direction is limited by a stop 18 on the piston, the same engageable with the exterior surface of part W of said casing. Motion of the piston in the rearward direction is limited by a stop shoulder 20 on the piston engageable with an adjacent convolution of the spring when compressing same during rearward movement of the piston.

Contained in casing 12 is a stop switch 21 comprising a flat strip 22 of hard electrical insulating material, and a superposed similar strip 23 slidable in a plane parallel to strip 22. Strip 22 has spaced-apart resilient contactors 24, the lower ends of which are received in metallic eyelets 19 on strip 22, the upper ends of the contactors passing through respective openings 19′ in strip 23. Coactive with the respective contactors and mounted on strip 22 are contacts 19a. A spring 25 between the two strips tends to hold strip 23 parallel to strip 22 thereby flexing the contactors to positions of disengagement from contacts 19a. Tab T is provided with a depending motion transferring means 20a which is coactive with strip 23 to move same and engage contactors 24 with their respective contacts 19a when the tab is depressed. Switch 21 follows the form and construction of the switch disclosed in said patent to Mann et al. No. 2,816,181. It follows that actuation of rocker rod R1 causes all actuators 10 and 10′ to tilt concurrently and engage similar fins on such tabs T and T1 that are in stop drawn conditions and to disengage from the tabs upon motion of piston 16 influenced by spring 17.

Mounted in stepped parallel relation in frame 11 and disposed rearwardly of rocker rod R1 are rocker rods 28, 29, 30 and 31. These rocker rods are shown in detail at FIGURES 3, 4, 5 and 6. In some respects, these rocker rods resemble rocker rod R1 and each thereof is adapted to turn in clockwise and counter clockwise directions respectively. At FIGURE 1A, four stop drawing pistons 34, 35, 36 and 37 are respectively coactive with said rocker rods 28, 29, 30 and 31. As will be more fully described hereinafter, said pistons are adapted to be individually operated, each thereof being indicative of a preset combination of stops.

Piston 34 at FIGURE 2 is coactive with rocker rod 28 which has a crank arm 30a freely received in an elongated slot 31a formed in the piston. A coil spring 32 encircles the piston and has its front end bearing against crank arm 30a and its rear end bearing against the inner surface of part W of casing 12. Forward motion of the piston is limited by a stop 33 thereon which is engageable with the outer surface of said part W of casing 12. Motion of the piston in a rearward direction is limited by a shoulder 34a on the piston engageable with an adjacent rearmost convolution of spring 32 when the piston is at the limit of its rearward movement.

At FIGURE 3, rocker rod 28 has a plurality of radially disposed elongated rigid tab actuators 35a, one of which is shown at FIGURE 2 in coactive relation to a respective tab T wherein it is noted that when the tab is in the full line stop retired position, actuator 35a inclines downwardly and forwardly and has its lower end disposed directly underneath fin 14. When piston 34 is moved in a forward direction to draw a preset combination of stops, crank arm 30a thereon will tilt in a clockwise direction, thereby causing arcuate motion of actuator 35a in the same direction and upward pressure thereof against fin 14 of tab T, thereby tilting the tab to the dotted line position. In this movement of the tab, depending motion transferring means 20a thereon imparts sliding motion to switch strip 23 in the direction opposite of arrow b, FIGURE 2. This flexes contactors 24 and firmly engages same with their respective contacts 19a, thereby close circuiting the switch with tone color system C with resulting concurrent transmission to amplifier E of a signal which is the sum of separate waveforms, each typical of a tone of given timbre. At FIGURE 3, rocker rod 28 has six radial elongated actuators 35a. FIGURES 4, 5 and 6 show other combination settings of actuators 35a on rocker rods 28, 30 and 31. To enable changing the combination settings to suit the taste of the player, the rocker rods will each have as many equidistantly related holes H as there are tabs T and T1, and the actuators may each thereof have the form of a threaded pin as shown at FIGURE 10 enabling interchangeability thereof in and selected longitudinal row thereof, or the rocker rods may each be as shown at 50, FIGURE 11, the same flattened at one side at 51, the actuator 52, for example, having one end 52a formed for close frictional sliding engagement with the rocker rod enabling moving it to any selected position for coaction with a respective tab.

Referring to FIGURE 8, the actuator 10 on rocker rod R1 and the actuators 35a on the respective rocker rods 28, 29, 30 and 31 extend downwardly and forwardly, the lower ends thereof intersecting each other immediately beneath the fin 14 of tab T. This can be taken to mean that any one or even all of said actuators are coactive with the same tab. Different settings of the actuators on their respective rocker rods 28, 29, 30 and 31 could require using the same stop for a preset combination. In this connection, fins 14 on the stop tabs are of sufficient width to accomodate therebeneath more than one actuator. To further allow for this, the tab actuators on any one rocker rod will be offset in a longitudinal plane from corresponding tab actuators on others of said rocker rods requiring a coactive relationship thereof with the same stop tab.

We particularly stress the feature of our invention consisting of at least one stop tab assembly such as tabs T or T2 which are operatable individually, and means coactive with said tabs enabling setting up combinations of stops, any one of which can be drawn by a control piston or equivalent device, and whereby, upon drawing a preset combination of stops, other tabs can be operated for drawing other stops for shading tonal colors.

We also place emphasis upon the combination comprising tabs T for the "Swell" manual and tabs T1, the latter for producing special sound effects.

A further important feature consists in the provision of means enabling all drawn stops identified by tabs T and T1 to be retired in a single operation.

At FIGURE 9, 60 is a modified form of piston for retiring, as a unit, all drawn tabs such as T and T1 or tabs T2, which, as previously described, are adapted to be operated by pistons 16 and 42 respectively. In this form, piston 60 has secured thereto a metallic member 61 having a vertical extension 62 which is bifurcated at 63 at its upper end. Rocker rod 64 may be considered the functional equivalent of rocker rod R1, the same having a depending crank 64a received in the bifurcation of said extension 62. Tightly encircling rocker rod 64 is a coil spring 65, one end of which is bent downwardly at 66 and angularly at 67, the latter portion pressing against crank pin 64a and tending to urge movement of the piston in a forward direction and thereby supplement the normal action of piston return spring 67′ and to restore all stop switches such as T and T1 or T2 to open circuit conditions. It is understood that rocker rod 64 will have actuators thereon functioning like 10 on rocker rod R1.

What we claim is:

1. A stop drawing and retiring mechanism comprising, a set of stop switches, a set of vertically tiltable stop tabs the individual ones of which are connected to respective switches of said set thereof enabling individually operating same, each stop tab having a flat rigid fin at its back end, and means for concurrently operating preassigned stop tabs of said set thereof enabling respectively drawing and retiring any selected combination of stops, said means comprising respective manually operated rocker rods disposed parallel to the axis of tilting motion of the stop tabs and having radially disposed rigid actuators freely engaging the fins of preassigned tabs of said set of tabs when said tabs are in retired conditions of tilted motion and adapted to press against and thereby tilt the tabs in a stop drawing direction in response to rotational motion of said rocker rods in one direction, and a manually operated rocker rod also disposed parallel to the axis of tilting motion of the tabs, said rod having radially disposed actuators in a number corresponding with the number of stop tabs of said set thereof and adapted to collectively freely engage with said fins and press thereagainst and tilt the tabs in a stop retiring direction and concurrently clear the mechanism of all drawn stops.

2. A stop drawing and retiring mechanism comprising, a casing having therein a set of longitudinally spaced apart electric stop switches and a set of vertically tiltable longitudinally spaced apart stop tabs individually manipulatable from exteriorly of the casing and having operative connection between their front and back ends with respective stop switches of said set thereof enabling selectively opening and closing the switches in response to tilting motion of said stop tabs first in one and then in an opposite direction about horizontal supporting axes; means in said casing selectively actuable from exteriorly thereof for imposing a lifting force against the back ends of preassigned stop tabs of said set thereof to tilt the tabs in a direction to concurrently close the stop switches common thereto and draw a combination of stops; and means in the casing selectively actuable from exteriorly thereof to impose a lowering force against the back ends of all stop tabs of said set of tabs whose stop switches are closed at the same instant so as to tilt the tabs in an opposite direction and concurrently open all stop switches of said set thereof and clear the mechanism of all drawn stops, the means for imposing said lifting force against the back ends of preassigned stop tabs comprising, a rocker rod provided with longitudinally spaced apart radially disposed rigid elongated actuators having extremities disposed immediately beneath and freely engaging said back ends of said preassigned tabs.

3. Mechanism as set forth in claim 2 wherein there is included a slidable manually actuable piston operatively connected to the rocker rod and resiliently biased to a position operatively relating the free extremities of the actuators to the said back ends of said preassigned stop tabs.

4. Mechanism as set forth in claim 2 wherein the means for imposing a lowering force against the back ends of all of the stop tabs of said set thereof comprises, a rocker rod having radially disposed actuators longitudinally spaced apart from each other a distance approximately equal to the spacing apart from each other of said stop tabs, said actuators formed, shaped and adapted for free pressing engagement with and against said back ends of said tabs and being normally resiliently biased a spaced distance above said back ends.

References Cited by the Examiner

UNITED STATES PATENTS

| | | | |
|---|---|---|---|
| 1,078,079 | 11/13 | Austin | 84—345 |
| 1,725,706 | 8/29 | Flaherty | 84—345 |
| 1,725,707 | 8/29 | Flaherty | 84—345 |
| 2,270,453 | 1/42 | Kern | 84—343 |
| 2,816,181 | 12/57 | Mann | 200—18 X |
| 2,954,716 | 10/60 | Raymond | 84—345 X |
| 3,124,992 | 3/64 | McClure | 84—345 |

FOREIGN PATENTS 27,227    1/56    Germany.

ARTHUR GAUSS, *Primary Examiner.*

CARL. W. ROBINSON, *Examiner.*